Patented Mar. 27, 1951

2,546,924

UNITED STATES PATENT OFFICE 2,546,924

POLYMERIZATION OF N-VINYL PYRROLE COMPOUNDS

Werner Freudenberg, Cranford, N. J., assignor to General Aniline & Film Corporation, New York, N. Y., a corporation of Delaware No Drawing. Application December 20, 1944, Serial No. 569,101

6 Claims. (Cl. 260—88.3)

The present invention relates to an improved method of polymerizing N-vinyl compounds, such as N-vinyl pyrrole, or N-vinyl compounds containing the pyrrole ring, such as N-vinyl carbazole, N-vinyl tetrahydrocarbazole, N-vinyl propyl carbazole, N-vinyl indole, and N-vinyl naphthocarbazole which may be produced in the manner disclosed in United States Patent No. 2,066,160 to Reppe et al., and may be polymerized in order to produce polymeric N-vinyl compounds.

When these N-vinyl compounds are polymerized, polymeric N-vinyl compounds are obtained which possess many unique and valuable properties. Polymeric N-vinyl compounds, such as polyvinyl carbazole, have been produced which are particularly valuable for use in the electrical field since the polymers which possess high melting or softening points also have very valuable electrical properties and are thus quite valuable as low loss electrical insulation materials in capacitors and elsewhere. Such polymeric N-vinyl compounds and methods of producing the same are disclosed in United States Patent No. 2,072,465 to Reppe, Keyssner and Dorrer.

The present invention is particularly directed to improvements in the method of polymerizing N-vinyl compounds in which the monomeric N-vinyl compound is dissolved in a solvent and polymerization is effected by the action of an acid catalyst.

I have discovered that the solvent employed during the polymerization exerts a marked effect on the polymerization reaction and on the properties of the polymers produced.

It is, therefore, an object of the present invention to provide an improved process for polymerizing N-vinyl compounds in which the solvents employed for the polymerization are such that desirable types of polymers may readily be obtained in very good yields. Other and further objects will be apparent as the present description progresses.

In practicing the present invention, the monomeric N-vinyl compound is dissolved in a halogenated aromatic solvent in which at least one of the carbon atoms in the ring is halogenated. Suitable solvents are mono-, chloro-, bromo- and fluoro-benzene and ortho- or meta-dibromo-, dichloro- and difluoro-benzene. The particular ratio of solvent to monomer which is employed per se exerts relatively little influence on the operability of the process and the exact proportions to be employed will, in general, be determined by practical and economic considerations, taking into account the other conditions, such as the temperature employed during the polymerization, and the type of polymer desired as a product.

In practicing the present invention, a sufficient amount of solvent should be employed to give a fluid, readily handable solution which is not too viscous after polymerization. In order to obtain a solution of this type at room temperature, a ratio of solvent to monomer of at least 1:1 is generally desirable since, at higher concentrations of the monomer, the solution, after polymerization, is apt to be too viscous to be easily handled. Slightly higher ratios of solvent to monomer are generally preferred since when more solvent is present, the heat generated during polymerization is dissipated better and more easily than when a low ratio of solvent to monomer is employed. As a practical matter, solvent to monomer ratios of approximately 2:1 or 3:1 may be used to good advantage, since, at this ratio of dilution, the product obtained is quite fluid and can be handled readily and, at the same time, the heat generated on polymerization may be removed without unusual difficulties, while the amount of solvent which must be recovered following polymerization is not excessive. Solvent to monomer ratios greater than approximately 10:1 are, in general, undesirable since the separation of the solvent from the polymer, after polymerization, and the recovery of the solvent when such relatively dilute solutions are employed becomes unnecessarily expensive.

The temperature of the solution is then adjusted to that at which it is desired to carry out the polymerization. When the other conditions of the reaction remain unchanged, the nature of the polymerization product obtained is influenced primarily by the temperature at which the polymerization is conducted, the degree of polymerization of the resulting polymer varying inversely as the temperature. The exact temperature to be employed will, therefore, largely be determined by the type of polymer which is desired. It should be noted, however, that with the solvents of the present invention, it is possible to obtain a higher degree of polymerization at a given temperature, as indicated by viscosity measurements of the polymer, than is possible when the solvents suggested in the prior art are employed. Useful polymers have been produced in accordance with the process of the present invention as temperatures varying from —75° C. to temperatures as high as +50° C., although in general, the polymerization will not be conducted at temperatures much above room temperature. Those skilled in the art can readily select, by simple preliminary test, the preferred temperature at which to conduct the polymerization, bearing in mind the nature of the polymer which is desired and the other conditions of reaction, such as the catalyst, which are to be employed.

The particular solvent which is employed will be determined primarily by economic considerations and the temperature at which the polymerization is to be effected. Mixtures of 2 or more of the solvents employed in the present invention may advantageously be employed when operating at relatively low temperatures in order to obtain a solvent having a lower melting point than certain of the specific solvents employed in this invention.

Once the solution of the monomer and the solvent has been adjusted to the desired temperature, the polymerization may readily be effected by adding an acid catalyst to the solution. The catalyst is preferably added relatively slowly and with constant stirring so as to avoid too violent a reaction and consequent undesired rise in temperature. We have found that any acid catalyst, particularly those of the type classified as Friedel-Crafts' reaction catalysts, are effective for the purposes of the present invention. Practically all inorganic acids, such as sulfuric or hydrochloric acids, are effective, as well as many organic acids, such as acetic acid. In addition, the salts of strong acids with weak bases, such as aluminum or zinc chloride, are quite effective. Our preferred catalyst is borontrifluoride and the subsequent description of the present invention will be limited to the use of this material as a catalyst. However, it should be understood that other acid catalysts may also be employed. The amount of catalyst which it is necessary to employ may be varied within relatively wide limits. A sufficient amount of catalyst must be employed to effect complete polymerization. However, in general, the best polymers are obtained when the use of any noticeable excess of catalyst is avoided. Too great an amount of catalyst tends to produce readily infusible and insoluble polymers which are desirable only for limited applications. Their formation, which is indicated by gelling of the reaction mass, should therefore be avoided. It is also preferable to avoid the formation of the soluble and lower melting type of polymers. Those skilled in the art can readily determine, by simple test, the specific amount of catalyst which is necessary to effect complete polymerization.

On addition of the catalyst, the polymerization proceeds rapidly and a rise in temperature of the solution can be detected. It is generally desirable, therefore, to cool the reaction mass in order to control the temperature of reaction and prevent any rise in temperature above that at which it is desired to carry out the reaction. After the desired amount of catalyst has been added, agitation of the mixture is continued until polymerization is completed.

When the polymerization has been completed, as indicated by no further generation of heat, the catalyst is preferably inactivated in any desired manner, for instance, by the addition of water or of a small amount of alkali, such as an alkali metal hydroxide or ammonia. The polymer may then readily be separated from the solvent by distillation of the solvent or by precipitation on addition of a second liquid, which dissolves the solvent employed for the polymerization but which is not soluble in and does not dissolve the polymer. Methanol or acetone are satisfactory precipitants for the polymer, since they are completely soluble in the solvents employed for polymerization but do not dissolve the polymer. Other separation steps or combinations of various separation steps, such as partial distillation of the solvent employed for the polymerization, followed by precipitation of the polymer by addition of methanol, may be employed.

The following specific examples illustrate the present invention, the parts are by weight:

Example 1

One hundred parts of N-vinyl carbazole were dissolved in 300 parts of chlorobenzene by stirring in a reaction vessel, care being taken to exclude atmospheric oxygen and moisture. The solution was chilled to $-5°$ C., and a minor amount of $BF_3.2H_2O$ (as a 1% solution in dioxane) was added gradually and with constant stirring and cooling so as to avoid an increase in temperature. Upon completion of catalyst addition, the temperature was allowed to rise to approximately 0° C. At the end of the reaction period, the original solution was a viscous syrup. Further catalytic action was arrested by the addition of 10 parts of water. The chlorobenzene was then removed by steam distillation, while agitation was continued, and finally the residual polymer was vacuum dried. The polymeric N-vinyl carbazole prepared in this way had a characteristic viscosity of 50 and was suitable for the fabrication of compression or extrusion molded articles.

Under similar conditions, the use of toluene as a solvent gave a polymer of much lower molecular weight. The mechanical properties of molded articles were considerably inferior as compared to the moldings obtained from polymer in Example 1.

Example 2

A solution of 90 parts of N-vinyl carbazole in 150 parts of o-dichlorobenzene was treated with a minor amount of a 3% solution of $BF_3$. dibutyl ether in dibutyl ether, added slowly and with constant stirring. After a polymerization period of 18 hours, during which the temperature was controlled at 15° C., the original solution became highly viscous. The polymer was precipitated by the addition of methanol. After filtration, a second treatment with boiling methanol was employed to effect further purification. After drying, 89 parts of a white, flocculent polyvinyl carbazole suitable for molding, paper impregnation, and metal coating were recovered.

Under similar conditions, a much poorer grade of polymer is obtained when benzene is employed as the solvent.

Example 3

A mixture of 50 parts of N-vinyl carbazole and 150 parts of chlorobenzene was treated with a minor amount of a 1% solution of $SnCl_4$ in dibutyl ether, added slowly and with constant stirring, care being taken to exclude atmospheric moisture. After stirring for 20 hours at 25–30° C., the polymeric N-vinyl carbazole was precipitated by the addition of methanol, after which it was filtered off and dried. There resulted 49 parts of polymer with a softening point in excess of 240° C. and suitable for molding, extrusion and electrical insulation purposes.

The polymer prepared in ligroin, toluene, xylene and their mixtures, with the same catalyst and other conditions the same, is not at all suitable for the above uses. It has a lower melting point, is more brittle, etc.

*Example 4*

A reaction vessel, provided with a means of stirring and cooling, was charged with 50 parts of N-vinyl carbazole and 100 parts of chlorobenzene, care being taken to exclude atmospheric moisture. After chilling to 3° C., there was added slowly, with vigorous agitation, 2 parts of a 1% solution of $SnCl_4$ in dibutyl ether and 0.25 part of a 1% solution of $BF_3.2H_2O$ in dioxane. The temperature rose from 3° C. to 20° C. but the polymerization did not get out of control and proceeded smoothly. At the end of 20 hours, the reaction mass was very viscous. The polymer was precipitated by the addition of methanol. After drying, there resulted 45 parts of polymeric N-vinyl carbazole which softened at about 250° C.

Under similar conditions, the reaction was difficult to control, when toluene was used as the solvent, and a much lower quality product resulted.

*Example 5*

A solution of 100 parts of N-vinyl carbazole in 100 parts of o-dichlorobenzene and 100 parts of chlorobenzene was placed in a reactor, provided with an efficient stirrer, and chilled to −30° C. after solution. Upon adding a small amount of a 3% solution of $BF_3$. dibutyl ether in dibutyl ether, with rapid stirring, the temperature rose from −30° C. to −25° C. After 13 hours at −25° C., the resulting viscous solution was treated with an excess of methanol and the polymer precipitated out in long, fibrous threads. This material was excellent for preparing compression molded articles.

*Example 6*

Twenty-five parts of vinyl carbazole were dissolved in a mixture of 25 parts of bromobenzene, 25 parts of fluorobenzene and 25 parts of chlorobenzene. The solution was cooled to −70° C. and a minor amount of $BF_3$. diethyl ether (as an 0.1% solution in methylene chloride) was added with stirring. Polymerization set in immediately. The resulting polymer was very suitable for the production of unsupported films.

I claim:

1. In a process of polymerizing N-vinyl pyrrole compounds wherein an N-vinyl pyrrole compound dissolved in a liquid solvent is subjected to the action of an acid polymerization catalyst, the improvement which comprises dissolving said N-vinyl pyrrole compound in a solvent selected from the class consisting of monochloro-, monobromo, and monofluoro-benzene and ortho- and meta-dichloro-, dibromo- and difluoro-benzene and subjecting the thus-obtained solution, while liquid and at a temperature below 20° C., to the action of an acid polymerization catalyst in such a predetermined minor amount as is sufficient to effect complete polymerization of said N-vinyl pyrrole compound, but which is less than that at which insoluble material is formed in the reaction mass.

2. In a process of polymerizing N-vinyl carbazole wherein N-vinyl carbazole dissolved in a liquid solvent is subjected to the action of an acid polymerization catalyst, the improvement which comprises dissolving said N-vinyl carbazole in a solvent selected from the class consisting of monochloro-, monobromo- and monofluoro-benzene and ortho- and meta-dichloro-, dibromo- and difluoro-benzene and subjecting the thus obtained solution, while liquid and at a temperature below 20° C., to the action of an acid polymerization catalyst in such a predetermined minor amount as is sufficient to effect complete polymerization of said N-vinyl carbazole, but which is less than that at which insoluble material is formed in the reaction mass.

3. The process as defined in claim 2 wherein the acid polymerization catalyst specified is boron trifluoride.

4. The process as defined in claim 3 wherein the solvent specified is ortho dichloro-benzene.

5. The process as defined in claim 2 wherein the acid polymerization catalyst specified is tin tetrachloride.

6. The process as defined in claim 2 wherein the acid polymerization catalyst specified is a mixture of boron trifluoride and tin tetrachloride, and the solvent specified is chlorobenzene.

WERNER FREUDENBERG.

REFERENCES CITED

The following references are of record in the file of this patent:

UNITED STATES PATENTS

| Number | Name | Date |
| --- | --- | --- |
| 2,072,465 | Reppe et al. | Mar. 2, 1937 |
| 2,087,079 | Wolff | July 13, 1937 |
| 2,231,905 | Hanford et al. | Feb. 18, 1941 |

FOREIGN PATENTS

| Number | Country | Date |
| --- | --- | --- |
| 500,211 | Great Britain | Feb. 6, 1939 |